United States Patent [19]
Zelickson

[11] Patent Number: 4,892,233
[45] Date of Patent: Jan. 9, 1990

[54] DISPENSING APPARATUS

[76] Inventor: Barry M. Zelickson, 1309 Westwood Hills Rd., St. Louis Park, Minn. 55426

[21] Appl. No.: 209,487
[22] Filed: Jun. 21, 1988
[51] Int. Cl.$^4$ ............................................. G01F 11/00
[52] U.S. Cl. .................................. 222/226; 222/284; 222/368; 141/144; 141/358
[58] Field of Search ...................... 222/168.5, 144, 283, 222/284, 216, 288, 305, 306, 368, 239, 240, 242, 226, 369; 141/165, 144, 129, 145, 358

[56] References Cited
U.S. PATENT DOCUMENTS

| | | | |
|---|---|---|---|
| 169,113 | 10/1875 | Mainer | 222/144 |
| 1,940,751 | 12/1933 | Hermani . | |
| 2,002,039 | 5/1935 | McPhee . | |
| 2,302,186 | 11/1942 | Caretto | 222/144 |
| 2,828,005 | 3/1958 | Ricke | 221/89 |
| 3,263,866 | 8/1966 | Proctor | 222/242 |
| 3,347,415 | 10/1967 | Strom | 222/168.5 |
| 4,071,171 | 1/1978 | Bassignani . | |
| 4,162,751 | 7/1979 | Hetland et al. . | |
| 4,560,092 | 12/1985 | Souza . | |

Primary Examiner—H. Grant Skaggs
Attorney, Agent, or Firm—Richard D. Allison

[57] ABSTRACT

The invention disclosed herein is a canister type of measuring and dispensing device featuring interchangeable canister sections and drawers and including a mixing lever in rotational engagement with a drawer holder wherein the drawers are removable from the drawer holder through an opening in the dispenser housing to provide an overall device which may be adapted to store nearly any quantity of granular material and to dispense the granular material from removable drawers having different dispensing dimensions.

18 Claims, 3 Drawing Sheets

DISPENSING APPARATUS

BACKGROUND OF THE INVENTION

The present invention relates to devices for measuring and dispensing granular materials and more particularly to a self-contained stackable dispensing and measuring device.

Prior art devices of the present type generally utilize a multi-compartment measuring chamber which reciprocates between fill and dispense positions. Other devices of this type incorporate a moveable wall in the dispensing compartment to provide for the measurement of varied quantities from a fixed size dispensing compartment. Yet another type of measuring and dispensing device is disclosed in my co-pending patent application, U.S. Ser. No. 174,343, filed on Mar. 28, 1988.

One type of hand held variable capacity measuring device is disclosed in U.S. Pat. No. 4,071,171, issued to Bassignani on Jan. 31, 1978. Bassignani discloses an attachment wherein the granular material is stored in an upright container and must be inverted when granular materials are dispensed therefrom. This device also includes a pair of barrier members wherein one barrier blocks the dispensing end of the device while the dispensing compartment is filled and the other barrier member blocks the filling end of the device while the material is dispensed. As with other devices, this device includes a moveable compartment wall to vary the quantity of material dispensed from the device.

Another type of dispensing device is disclosed in U.S. Pat. No. 4,162,751 issued to Hetland et al., on July 31, 1979. The Hetland devices discloses the use of rotary type dispensing compartment. The Hetland device is for use either as an upright dispensing container or as a hand held dispensing apparatus. In this device the dispensing compartment is a rotary type compartment which is physically rotated from a filling position to a dispensing position and includes a moveable compartment wall to provide for the dispensing of varied quantities of material.

Another general type of dispensing device is disclosed in U.S. Pat. No. 1,940,751 issued to Hermani on Dec. 26, 1933. The Hermani patent discloses a canister type dispensing apparatus wherein a plurality of dispensing compartments are arranged so that while one compartment is dispensing the material, another compartment is simultaneously being filled. Additionally, the dispensing and storage compartments of Hermani are of a fixed dimension and are not interchangeable.

My co-pending patent application discloses the use of interchangeable drawers having different sizes of open and closed bottom drawers. Due to the nature of its design, my prior invention is particularly adapted for use with a dispensing stand so that the dispensing apparatus is elevated from the counter top

SUMMARY OF THE INVENTION

An object of the present invention is to provide a measuring and dispensing device which is simple to operate and may be easily disassembled for cleaning.

Another object of the present invention is to provide a measuring and dispensing device which is inexpensive to manufacture and has relatively few operating parts.

Another object of this invention is to provide a dispensing apparatus which may be stacked on top of another dispensing apparatus to decrease the amount of counter space necessary to store multiple dispensing apparatuses.

A feature of the present invention is that the dispensing units may be stacked on top of one another to allow for convenient storage of the dispensing units. Additionally, the storage area of the dispensing unit includes an interchangeable canister to allow for the storage of larger or smaller quantities of granular materials so that a commonly used granular material such as flour may be stored in a larger container, whereas a less frequently used granular material such as sugar may be stored in a smaller canister. As a compliment to the interchangeable canisters, the drawers are also interchangeable. The use of interchangeable drawers, enables the user to install drawers having the most commonly used dispensing volumes for the particular granular material.

A further feature of the present invention is that the entire dispensing unit may be readily disassembled such as for cleaning, by merely removing a clip located on the bottom of the dispenser. The entire dispensing device consists essentially of a storage area and a dispensing area. The storage area has as its primary components a cover and an interchangeable canister. The bottom surface of the canister includes a pair of dispensing openings to allow the granular material to flow from the storage area into the dispensing area. Additionally, the mixing lever of the present invention is located along the bottom surface of the canister. The shaft of the mixing lever extends downwardly to the bottom of the canister and engages the drawer holder of the dispensing areas so that whenever the drawer holder is rotated, the mixing lever also rotates.

The dispensing area includes as its primary components, a drawer holder; interchangeable drawers, and a dispenser housing which substantially encloses the drawer holder and drawers. The bottom surface of the dispenser housing includes a shaft opening which allows the shaft of the mixing lever to extend downwardly through the entire dispensing area. The bottom of the shaft is held in place by a clip which engages the bottom of the shaft and the dispenser housing to retain the elements of the dispensing device in rotational alignment. Additionally, the inner surface of the dispenser housing includes a dispenser lock which engages the bottom surface of the drawer holder to facilitate the removal of the desired drawer through the opening in the dispenser housing.

An advantage of the present invention is that it includes a variety of features to prevent the inadvertent dispensing of material from the dispensing device.

Another advantage of the present invention is that it provides interchangeable dispensing compartments for dispensing the most commonly used quantities of granular material.

Another advantage of the present invention is that the interchangeable canisters and drawers may be easily combined to provide a dispensing device which will store the optimum quantity of granular material and allow for the convenient dispensing of the most commonly used quantities of that particular material.

Another advantage of the present invention is that the dispensing devices may be stacked on top of one another to minimize the amount of counter space required to use the present invention.

DETAILED DESCRIPTION OF THE PREFERRED EMBODIMENT

Figure 1:
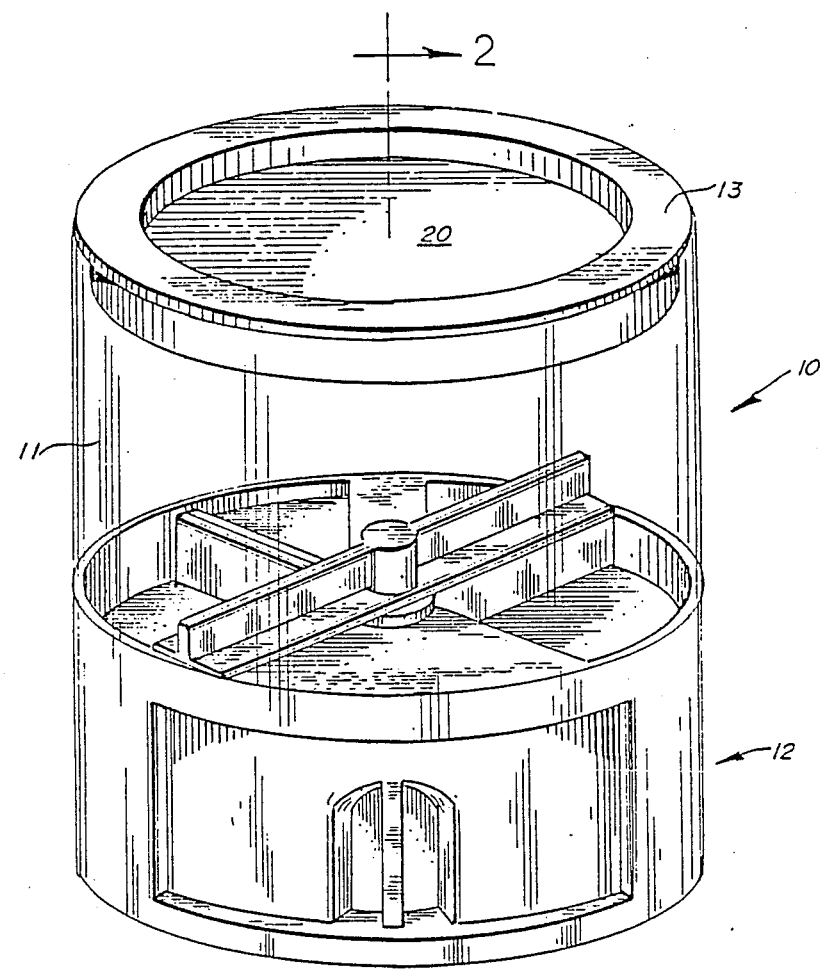
FIG. 1 is a perspective view of the present invention.
Figure 4:
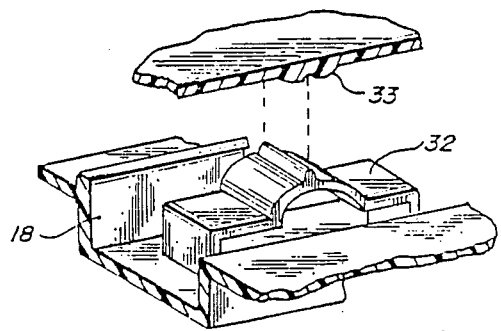
FIG. 4 is a partial cutaway view of the present invention taken along lines 4—4 of FIG. 3.
Figure 2:
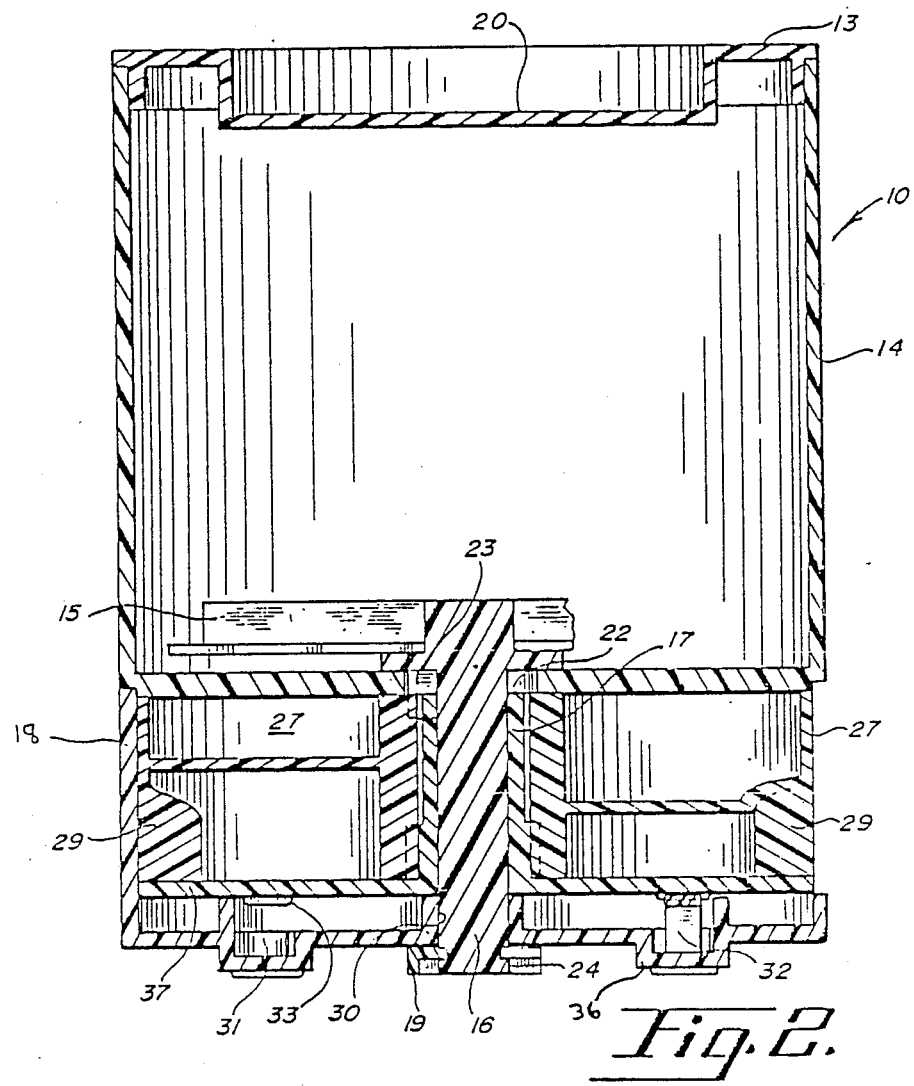
FIG. 2 is a cross sectional view of the present invention taken along lines 2—2 of FIG. 1.
Figure 3:
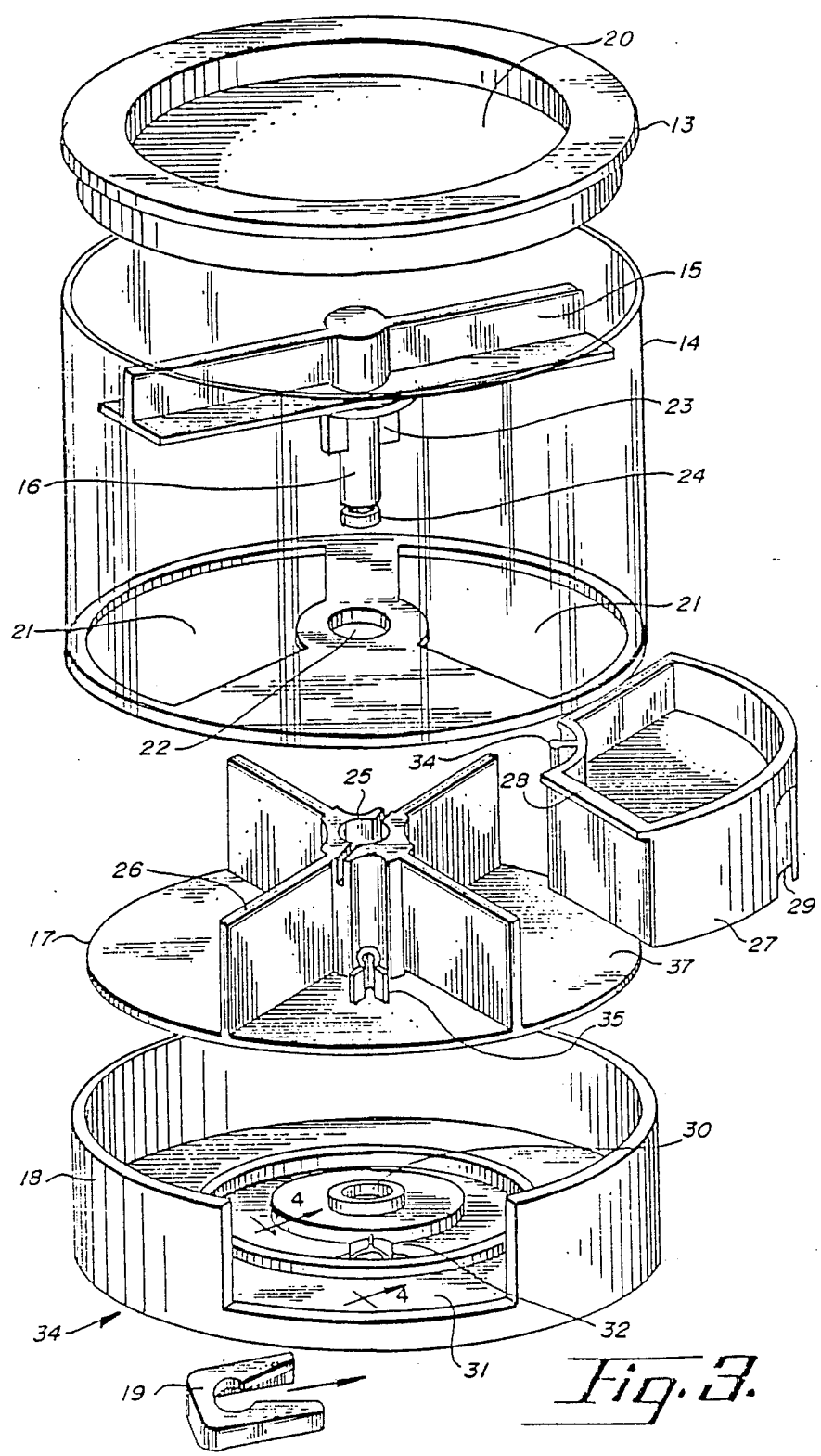
FIG. 3 is an exploded perspective view of the present invention illustrated in FIG. 1.

The present invention is a canister type dispensing device preferably constructed of molded plastic and is referred to herein generally as 10. The dispensing device 10 has as its primary sections a storage area 11 and a dispensing area 12. The storage area 11 has as its primary elements a top cover 13 and a canister 14. The top cover 13 includes a top indent 20 to enable the various dispensing devices 10 to be stacked on top of one another. The bottom surface of the canister surface 14 includes a pair of dispensing openings 21 to allow the granular material to flow from the storage area 11 into the dispensing area 12. Additionally, the lower surface of the canister 14 encloses a mixing lever 15. The mixing lever 15 mixes the contents of the canister 14 and assists in the filling and leveling of the drawers 27 in the dispensing area 12. The mixing lever 15 includes a shaft 16 which extends downwardly from the bottom of canister 14 through the shaft opening 22.

The dispensing area 12 includes as its primary components, a drawer holder 17, interchangeable drawers 27 and the dispenser housing 18. The drawer holder 17 includes a plurality of divider walls 26, a base 37 and an alignment ring 25. The alignment ring 25 engages an alignment extension 23 located on the shaft 16 to allow the mixing lever 15 to rotate whenever the drawers 27 or the drawer holder 17 is rotated.

The dispenser housing 18 encloses the drawer holder 17 and the removable drawers 27. A shaft opening 30 is centrally located on the bottom surface of the dispenser housing 18 to allow the shaft 16 of the mixing lever 15 to pass therethrough. Additionally, a rotation groove 31 is located on the bottom inner surface of the dispenser housing 18 to enable the drawer detents 33 located on the bottom surface of the drawer holder 17 to rotate in the groove 31. The rotation groove 31 includes drawer locks 32 which operate to engage drawer detents 33 to assist in aligning the drawer 27 with drawer opening 38. Finally, the bottom surface of the dispenser housing 18 includes a stacking rim 36 to enable multiple dispensing devices 10 to be stacked on top of one another.

In the preferred embodiment, the dispensing device 10 includes four removable drawers 27. These drawers 27 are constructed so as to provide for the dispensing of a fixed volume of granular material from the dispensing device 10. Drawers 27 are generally pie-shaped and include drawer lips 28 and drawer handles 29. The drawer lips 28 are arranged so that when a pair of drawers 27 are arranged adjacent to one another in the drawer holder 17, the drawer lips 28 will prevent granular material from flowing into or contacting the drawer holder 17. Additionally, the inner surface of each drawer 27 includes a drawer extension 34 which releasably engages the drawer bracket 35 located on the drawer holder 17 to prevent the drawers 27 from accidentally sliding out of the dispensing device 10.

In operation, granular material is generally stored in the canister 14 of the dispensing device 10. When the user wants to dispense granular material from the dispensing device 10, the drawers 27 are rotated which, causes the shaft 16 and mixing lever 15 to rotate. Rotation of the mixing lever 15 causes the granular material to flow into the rear drawers 27 through the dispensing openings 21. Additionally, when the level of granular material is low, the mixing lever 15 will evenly distribute the remaining granular material into the drawers 27. Once the drawers 27 are filled, the drawers are rotated until the drawer lock 32 contacts the drawer detent 33. When this occurs, the front drawer 27 is in alignment with the drawer opening 38 of the dispenser housing 18. The user may then remove the front drawer 27 from the dispensing device 10 by grasping the handle 29 of the drawer 27 and releasing the drawer extension 34 from the drawer bracket 35. Finally, by providing a solid surface on the bottom of the canister 14 between the dispensing openings 21, granular material is prevented from flowing downwardly into the front drawer 27 when the drawer 27 is in alignment with the drawer opening 38 once the drawer 27 is removed.

If the user desires to clean the dispensing device 10, the entire apparatus may be disassembled by merely removing clip 19. Clip 19 engages the clip retaining ring 24 located on the bottom of shaft 16. By removing the clip 19, the shaft 16 no longer holds the dispenser housing 18, the drawer holder 17 or the canister 14, in position. When the user wants to reassemble the dispensing device 10, the mixing lever 15 is inserted into the canister 14 so that shaft 16 passes through shaft opening 22. Next, the drawer holder 17 and the drawers 27 are placed on shaft 16 so that alignment extension 23 fits within alignment ring 25. Finally, the bottom of shaft 16 is inserted through the shaft opening 30 of the dispenser housing 18 and clip 19 is attached to engage clip retaining ring 24.

I claim:

1. A measuring and dispensing device for dispensing granular material wherein the device comprises
    a canister for storing and dispensing material therefrom, said canister further having top and bottom ends wherein the bottom end includes at least one dispensing opening, said dispensing opening being in flow communication with at least one removable drawer, said drawer being positioned in a rotatable drawer holder, said drawer holder and drawer being substantially enclosed and rotatable within a dispenser housing, and
    a mixing lever in said canister and said mixing lever being in rotational engagement with said drawer holder so that when said drawer holder is rotated, said mixing lever rotates.

2. The measuring and dispensing device of claim 1, wherein the drawer includes an inwardly directed extension for releasably engaging the drawer holder and said drawer being removable from said drawer holder through a drawer opening in said dispenser housing.

3. The measuring and dispensing device of claim 2, wherein said drawer has sidewalls and a bottom of a fixed dimensional to provide for the dispensing of a predetermined quantity of granular material from said drawer and said drawer further having at least two lips extending outwardly from the top of said sidewalls.

4. The measuring and dispensing device of claim 2, wherein said drawer holes includes a detent along the lower surface of the drawer holder for releasably engaging a drawer lock located on the dispenser housing to indicate alignment of said drawer with said drawer opening as said drawer holder is rotated in either direction with said dispenser housing.

5. The measuring and dispensing device of claim 1, wherein said mixing lever includes a downwardly oriented shaft for rotationally engaging said drawer holder.

6. The mixing lever of claim 5, wherein said shaft is held in an engaging relation with said drawer holder and dispenser housing by a locking means.

7. A measuring and dispensing device for dispensing granular material wherein the device comprises, a storage area in flow communication with a dispensing area, said storage area including a canister and a top cover, said canister including at least on dispensing outlet in flow communication with said dispensing area and further enclosing a mixing lever, said dispensing area including a plurality of removable drawers, a drawer holder and a dispenser housing, said drawers including an inwardly directed extension for releasably engaging said drawer holder, said dispenser housing including a drawer lock for releasably engaging the drawer holder as said drawer holder is rotated in either direction therein and a drawer opening for the removal of said drawer therethrough, and said mixing lever including a shaft thereon for rotationally engaging said drawer holder.

8. The measuring and dispensing device of claim 7, wherein said shafts extends through said drawer holder and said dispenser housing and engages a releasable locking means near the bottom of said dispenser housing.

9. THe measuring and dispensing device of claim 7, wherein said device includes a plurality of drawers having fixed bottom and sidewalls, said sidewalls further including outwardly extending lips along the top surface of said sidewalls.

10. The measuring and dispensing device of claim 7, wherein the bottom surface of the storage area includes a solid section oriented in alignment with said drawer opening to prevent the flow of granular material from the storage area into said drawer holder when said drawer is removed.

11. The measuring and dispensing device of claim 7, wherein said shaft includes an alignment extension for aligning and rotationally engaging said drawer holder with said mixing lever.

12. A measuring and dispensing device for dispensing granular material therefrom, wherein the device comprises;

a canister for storing granular material therein, said canister further having top and bottom ends wherein the bottom end includes at least one dispensing opening therein, said canister opening being in flow communication with at least one removable drawer and wherein said drawer is rotatable within the bottom end of said canister, and said drawer being removable from said canister through a drawer opening therein.

13. The device of claim 12, wherein a mixing lever is positioned in said canister in rotational engagement with said drawer.

14. The device of claim 12, wherein said canister includes the drawer opening therein near the bottom end of said canister and wherein said drawer is in flow communication with the dispensing opening and removable through said drawer opening.

15. The device of claim 12, wherein said drawer includes an inwardly directed extension thereon for releasably engaging a drawer holder rotatably positioned within said canister.

16. The device of claim 15, wherein said drawer holder is rotatable about a central shaft in said canister.

17. THe device of claim 15, wherein said drawer holder includes a detent along the lower surface of said drawer holder for releasably engaging a drawer lock located along the bottom end of said canister to indicate alignment of said drawer with said drawer opening.

18. The device of claim 12, wherein said device includes a plurality of drawers rotatably within said canister and wherein said drawers include bottom and sidewalls and outwardly extending lips extending from the top surface of said sidewalls.

* * * * *